United States Patent
Simmons et al.

(10) Patent No.: US 8,166,213 B2
(45) Date of Patent: Apr. 24, 2012

(54) CONTROLLER WITH INDIRECT ACCESSIBLE MEMORY

(75) Inventors: Michael Simmons, Chandler, AZ (US); Howard Henry Schlunder, Mesa, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 243 days.

(21) Appl. No.: 11/944,138

(22) Filed: Nov. 21, 2007

(65) Prior Publication Data

US 2009/0132734 A1  May 21, 2009

(51) Int. Cl.
*G06F 5/00* (2006.01)
(52) U.S. Cl. .......................................................... 710/52
(58) Field of Classification Search ...................... 710/55
See application file for complete search history.

(56) References Cited

U.S. PATENT DOCUMENTS

| 4,403,283 | A | * | 9/1983 | Myntti et al. | 711/2 |
| 4,965,748 | A | * | 10/1990 | Chang et al. | 710/66 |
| 5,109,334 | A | * | 4/1992 | Kamuro | 711/206 |
| 5,155,830 | A | * | 10/1992 | Kurashige | 710/24 |
| 5,805,927 | A | * | 9/1998 | Bowes et al. | 710/23 |
| 5,867,672 | A | * | 2/1999 | Wang et al. | 710/307 |

FOREIGN PATENT DOCUMENTS

EP   1396786 A1   10/2004

OTHER PUBLICATIONS

International Search Report for PCT/US2008/084350, mailed Jul. 6, 2009.

* cited by examiner

*Primary Examiner* — Henry Tsai
*Assistant Examiner* — Juanito Borromeo
(74) *Attorney, Agent, or Firm* — King & Spalding, L.L.P.

(57) ABSTRACT

A controller has an interface, a buffer memory, a first set of registers for accessing the buffer memory, a second set of registers independent from the first set of registers for accessing the buffer memory, and a control unit for decoding and executing buffer memory access commands received by the interface to access the buffer memory through either the first or second set of registers.

25 Claims, 5 Drawing Sheets

CONTROLLER WITH INDIRECT ACCESSIBLE MEMORY

TECHNICAL FIELD

The technical field of the present application relates to controllers with an indirectly accessible memory.

BACKGROUND

Many controller exist, in particular stand alone controllers, that comprise a large memory that is not directly accessible by a processor due to constraints in address size of an associated interface. For example, Ethernet controllers, in particular stand alone Ethernet Controllers, are designed to serve as an Ethernet network interface for any type of microprocessor or microcontroller. Such a controller can have a fairly large memory and may include a dedicated interface such as a serial peripheral interface (SPI) bus. In some embodiments, such an Ethernet controller may also be integrated in a microcontroller using the SPI bus or any other capable interface connection. In case of an Ethernet controller, the controller handles all communication protocols and comprises a large buffer for intermediate storage of incoming and outgoing messages. A microcontroller or microprocessor may then communicate and control the Ethernet controller via the interface. The stand alone or an integrated Ethernet controller handles coordination of incoming and outgoing data packets as well as packet filtering. It may further comprise an internal direct memory access (DMA) module for fast data throughput and hardware assisted checksum calculation. The communication of an Ethernet controller with a microcontroller or microprocessor can be established interrupt or polling driven.

As stated above, the buffer incorporated in this type of controllers is relatively large and, therefore, cannot be directly addressed, due to address size limitations of the communication protocols of the respective interface. Hence, the buffer is generally accessed through a windowed interface via a set of control registers. Such a set of control registers comprises a register for data to be written or read and at least one pointer register containing the physical read or write address of the buffer. This accessing scheme however may cause a bottleneck in present Ethernet controllers in particular for operations that often switch between read and write access or between different tasks accessing the Ethernet buffer that make it necessary every time a switch occurs to save the content of the pointer registers.

SUMMARY

According to an embodiment, a controller may comprise an interface, a buffer memory, a first set of registers for accessing the buffer memory, a second set of registers independent from the first set of registers for accessing the buffer memory, and a control unit for decoding and executing buffer memory access commands received by the interface to access the buffer memory through either the first or second set of registers.

According to a further embodiment, the first set of registers may comprise a first read pointer register and a first write pointer register and the second set of registers may comprise a second read pointer register and a second write pointer register. According to a further embodiment, the controller may further comprise an auto-increment or auto-decrement unit for incrementing or decrementing the content of at least one register of the first and/or second set of registers. According to a further embodiment, the controller may further comprise a wrap around unit for resetting the address stored in at least one pointer register of the first and/or second set of registers to a predefined address. According to a further embodiment, the controller may further comprise at least one multiplexer coupled with each pointer register. According to a further embodiment, the multiplexer further may receive a direct address signal. According to a further embodiment, the controller may further comprise a special function register for defining a split address in the buffer memory splitting the buffer memory into a first segment assigned to the first set of registers and a second segment assigned to the second set of registers. According to a further embodiment, the controller may further comprise a plurality of special function registers for defining memory segments in the buffer memory assigned to each set of registers. According to a further embodiment, the controller may further comprise at least a third set of registers independent from the first and second set of registers for accessing the buffer memory, wherein the third set of registers comprises a third read pointer register and a third write pointer register. According to a further embodiment, the controller may be an Ethernet controller and the packet buffer memory may be coupled with the set of registers and coupled with transmit and receive units of the Ethernet controller.

According to another embodiment, an Ethernet controller may comprise a physical layer and a media access control layer, a buffer memory, a physical and media access control layer coupled with the buffer memory, a set of transmit (TX) registers coupled with the buffer memory, comprising a first read pointer register and a first write pointer register, a set of receive (RX) registers coupled with the buffer memory, comprising a second read pointer register and a second write pointer register, a set of user defined registers coupled with the buffer memory, comprising a third read pointer register and a third write pointer register, and a control unit for decoding and executing buffer memory access commands received by an interface to access the buffer memory through either said transmit, receive, or user defined registers.

According to a further embodiment, the Ethernet controller may further comprise an auto-increment or auto-decrement unit for incrementing or decrementing the content of any one of the pointer registers. According to a further embodiment, the Ethernet controller may further comprise a wrap around unit for resetting the address stored in any one of the pointer registers to a predefined start address. According to a further embodiment, the Ethernet controller may further comprise at least one multiplexer coupled with each pointer register. According to a further embodiment, the multiplexer further may receive a direct address signal. According to a further embodiment, the Ethernet controller may further comprise a special function register for defining a split address in the buffer memory splitting the buffer memory into a first segment assigned to the transmit registers and a second segment assigned to the receive registers. According to a further embodiment, the Ethernet controller may further comprise a plurality of special function registers for defining a memory segment for the user defined registers. According to a further embodiment, the Ethernet controller may further comprise a plurality of special function registers for defining memory segments in the buffer memory assigned to each set of registers.

According to yet another embodiment, a method for accessing a memory in a controller through an interface with limited addressing capabilities, may comprise the steps of: loading a first address of the memory through the interface into a first address register of a first set of access registers; loading a second address of the memory through the interface into a second address register of a second set of access registers; receiving a first read command through the interface; accessing the memory through the first address register and receiving first data from the first address in the memory; outputting the first data through the interface; receiving a second read command through the interface; accessing the memory through the second address register and receiving second data from the second address in the memory; and outputting the second data through the interface.

According to a further embodiment, the method may further comprise the step of auto-incrementing or auto-decrementing the first and second address registers after reading the memory. According to a further embodiment, the method may further comprise the step of performing an address wrap around function on the first and second address registers after auto-incrementing or auto-decrementing. According to a further embodiment, the method may further comprise the steps of: loading a third address of the memory through the interface into a third address register of a third set of access registers; loading a third address of the memory through the interface into a third address register of a third set of access registers; receiving a third read command through the interface; accessing the memory through the third address register and receiving third data from the third address in the memory; and outputting the third data through the interface.

According to yet another embodiment, a method for accessing a memory in a controller through an interface with limited addressing capabilities, may comprise the steps of: loading a first address through the interface into a first address register of a first set of access registers; loading a second address through the interface into a second address register of a second set of access registers; receiving a first write command through the interface; receiving first write data through the interface; accessing the memory through the first address register and storing the first data under the first address into the memory; receiving a second write command through the interface; receiving second write data through the interface; and accessing the memory through the second address register and storing the second data under the second address into the memory.

According to a further embodiment, the method may further comprise the step of auto-incrementing or auto-decrementing the first and second address registers after reading the memory. According to a further embodiment, the method may further comprise the step of performing an address wrap around function on the first and second address registers after auto-incrementing or auto-decrementing. According to a further embodiment, the method may further comprise the steps of: loading a third address through the interface into a third address register of a third set of access registers; loading a third address through the interface into a third address register of a third set of access registers; receiving a third write command through the interface; receiving third write data through the interface; and accessing the memory through the third address register and storing the third data under the third address into the memory.

Other technical advantages of the present disclosure will be readily apparent to one skilled in the art from the following figures, descriptions, and claims. Various embodiments of the present application may obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

Generally such a stand alone controller or a module which can be integrated into a microcontroller has an interface with limited address capabilities. For example, a typical 8 bit serial interface would require a plurality of address transmissions to form a long address capable of addressing every memory location in a large buffer memory. Thus, direct access through such an interface would form a bottleneck and slow transmissions rates significantly down. Therefore, such modules comprise a windowed access mechanism in which an address register is used to provide for the actual address. This address register usually only has to be set once in most applications, such as Ethernet controllers, because the access to such a large buffer is usually sequential. In other words, once a specific memory location has been accessed, the address only needs to be incremented or decremented depending on the writing mechanism to access the next memory location. This increment or decrement function can be automatically handled by the controller without the support of the external processor. Thus, for reading and writing access an auto-increment and/or auto-decrement functionality is implemented. The microcontroller needs to initiate the address registers once through the serial interface and then only needs to send a read or write command every time access to the buffer is required. The respective Ethernet module or controller then answers this command by sending or receiving the respective data from or to the memory, by incrementing or decrementing the pointer register and by waiting for the next command. Other commands, such a block read or block write can be implemented which cause the respective controller to transmit a plurality of sequential data, for example, one or more data packets, from or to such a large buffer.

Figure 1:
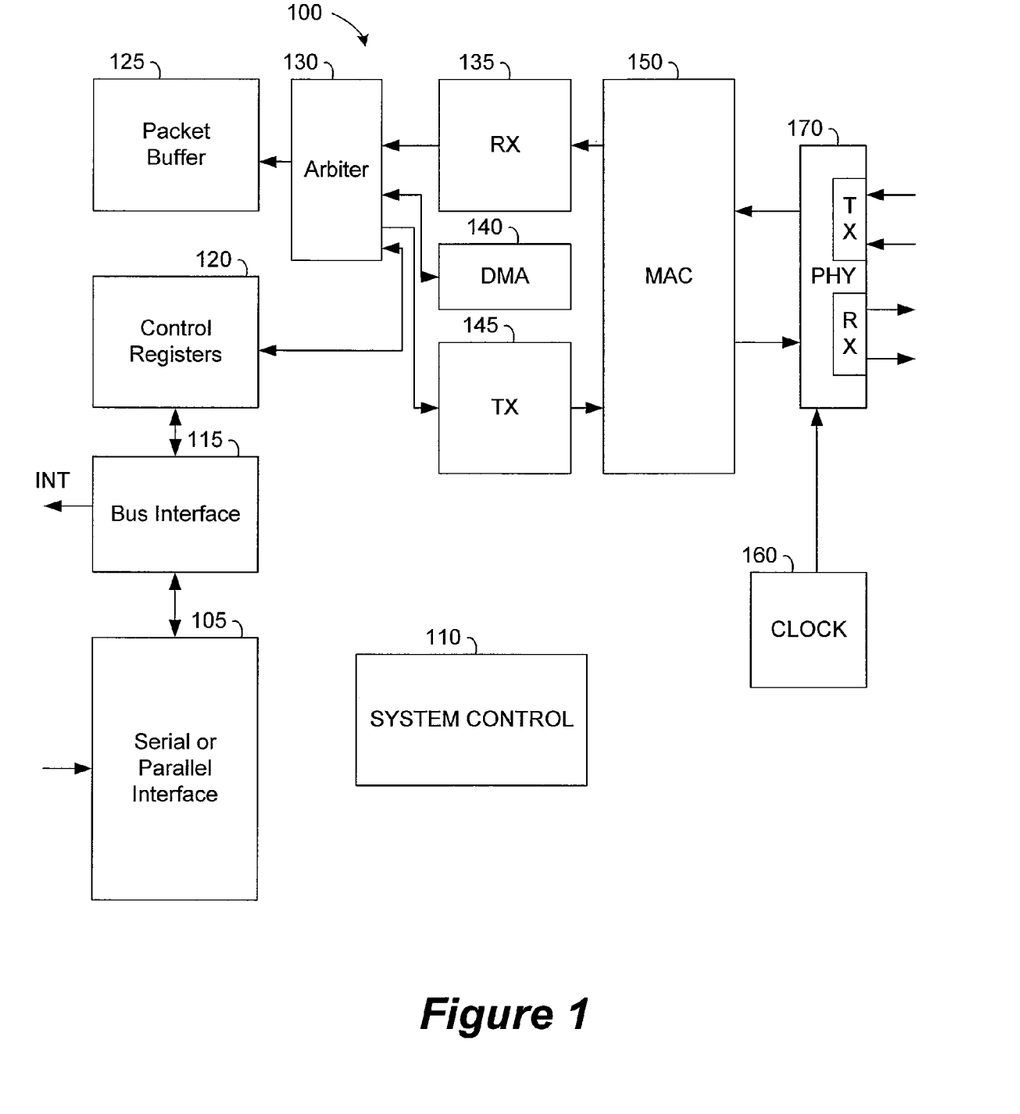
FIG. 1 is a block diagram of an Ethernet controller module as used in a stand alone Ethernet controller or an integrated module for a microcontroller.

FIG. 1 shows as an embodiment of a controller a block diagram of a Ethernet controller 100 that can be a stand alone Ethernet controller or an Ethernet controller module integrated, for example, in a microcontroller. The Ethernet controller 100 comprises a typical physical layer (PHY) 170 with transmit and receive units TX and RX for transmitting and receiving of the actual analog data over the network. This physical layer 170 is coupled with a media access control (MAC) data link layer 150 for implementing the actual Ethernet standard (IEEE 802.3). The Mac layer 150 is coupled with a receive unit 135 and a transmit unit 145 which may include respective filter units flow control and host interfaces. The Ethernet controller may also include a direct memory access (DMA) controller 140 capable of performing, for example, a checksum evaluation. An arbiter 130 may be implemented to switch coupling between the actual buffer 125 and the modules 120, 135, 140, and 145. The control registers 120 are coupled with a bus interface 115 and a serial or parallel interface 105. The serial interface can be, for example, a SPI interface or any other suitable inter circuit interface. The bus interface 115 may provide for additional interrupt signals to provide for additional control of the Ethernet controller 100. The Ethernet controller 100 may be internally controlled by a system control unit 110 which controls the respective units of the Ethernet controller 100. System control unit 110 receives commands from the serial or parallel interface 105 and provides for decoding of these commands. The commands can provide for reading and writing of at least some or all registers and for executing functions of the respective controller. In particular, the system control 110 may provide for the respective control sequences to perform read and write access to the buffer 125 as will be explained in more detail below. Clock unit 160 provides for the required Ethernet transmission clock signal.

Figure 2:
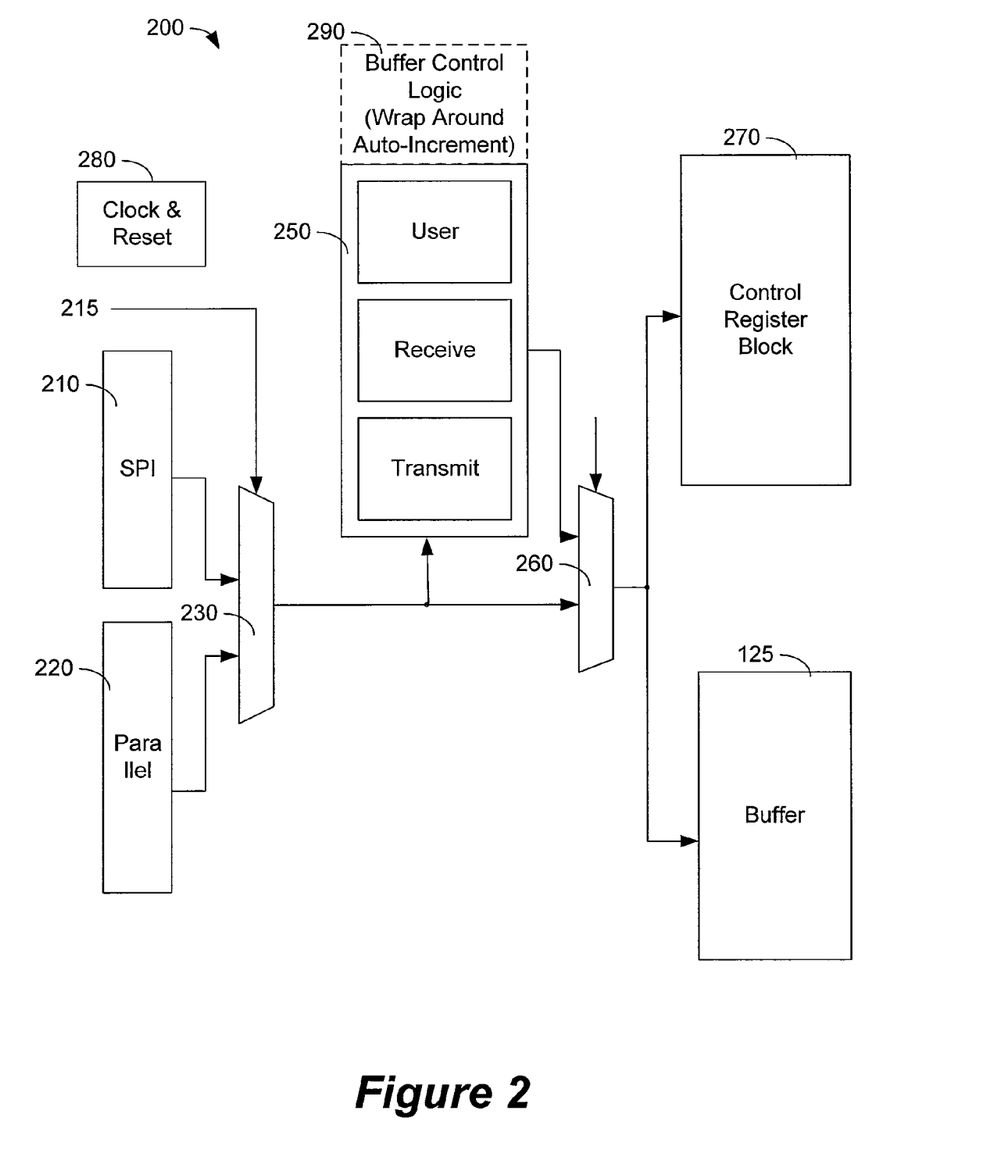
FIG. 2 illustrates an embodiment of a buffer access logic.

FIG. 2 shows certain details of a specific section 200 of another embodiment of any type of controller having a window access memory. In this embodiment, multiple interfaces for a microcontroller or microprocessor are provided. A first interface is provided by SPI interface 210 and a second by parallel interface 220. Both interfaces may be limited in their address capability and therefore require the windowed memory access. Both interfaces are coupled with a multiplexer 230 which is controlled by signal 215 which can be supplied externally. Thus, the device 200 can operate with either a parallel or a serial interface. The output of multiplexer 230 is coupled to various control registers and to the input of a further multiplexer 260. The various control registers may comprise a set of multiple window access registers 250. Furthermore, other buffer control logic and/or registers can be provided. Such additional control logic 290 can for example provide for auto-increment and/or auto-decrement and wrap around functionality of the pointer registers and, thus, control and manage the boundaries for predefined memory segments in the buffer. For example, the read channel and the write channel may have assigned memory segments in the buffer. To avoid any type of overwriting by data from one channel into another channel, these boundary control 290 can monitor the access address stored in the respective registers and provide for wrap around functionality if a pointer register oversteps a boundary. However, in other embodiments the memory segments can also overlap to allow for enhanced functionalities.

The output of multiplexer 260 is coupled to the actual buffer 125 and can be optionally also coupled to a control register block 270 comprising a plurality of special function registers. Furthermore, as indicated by block 280, clock and reset logic can be provided. The window access registers 250 may include three sets of data/pointer registers. Each data/pointer register set comprises separate read and write pointer registers and may also include a data register or latch. In some embodiments, a data register such as a latch may not be necessary and the data input output may be directly routed to respective data busses of the system. In other embodiments, only two set of registers or more than 3 set of registers can be provided.

Figure 3:
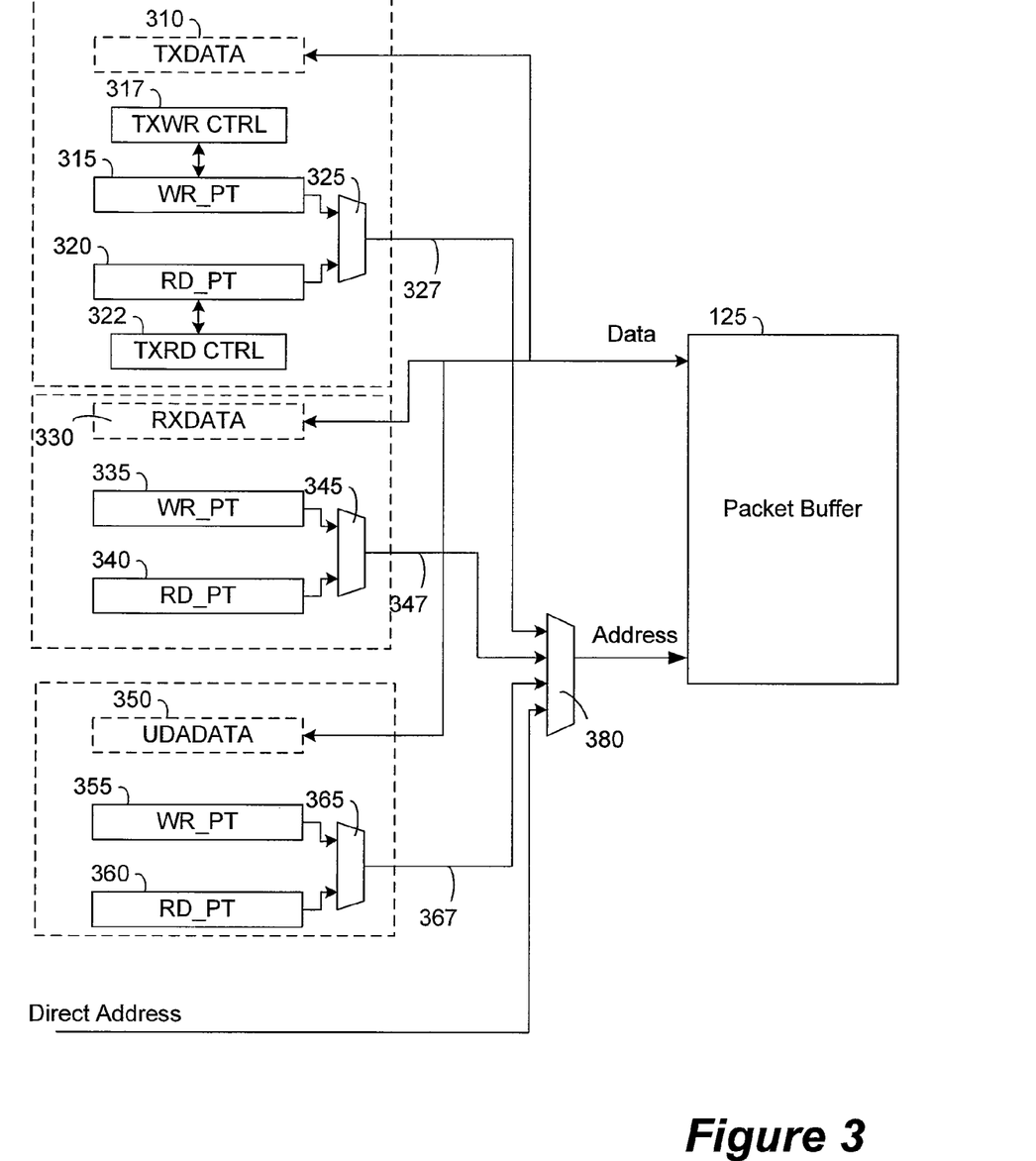
FIG. 3 illustrates another embodiment of a buffer access logic.

FIG. 3 shows more details of one possible implementation of three register sets according to an embodiment. A first set of registers is dedicated to a first channel, for example, the transmit channel TX. It may comprise a data register or latch 310. However, as indicated by the dotted lines, this register may simply represent a memory mapped address within the packet buffer 125 which causes the data to/from the buffer 125 to be transferred from/to the SPI/Parallel interface 210/220. Each set of registers comprises a write pointer register 315 and a read pointer register 320. In one embodiment, the read and write pointer registers 315 and 320 can be coupled with a multiplexer 325 which outputs an address signal 327 fed to a first input of a multiplexer 380. The data 310 is received from packet buffer 125. Similarly, a second set of registers is dedicated to a second channel, for example, the receive channel RX. It comprises a write pointer register 335 and a read pointer register 340. Again, a data latch 330 can be implemented depending on various design choices. The read and write pointer registers 335 and 340 are coupled with a multiplexer 345 which outputs an address signal 347 fed to a second input of multiplexer 380. If implemented, the data latch 330 is coupled with packet buffer 125 for data input/output. Finally, a third set of registers is dedicated to a third channel, providing for example a user defined access. The set comprises a write pointer register 355 and a read pointer register 360. It may again optionally comprise a data latch 350. The read and write pointer registers 355 and 360 are coupled with a multiplexer 365 which outputs an address signal 367 fed to a third input of multiplexer 380. The data latch 350 can be coupled directly with the data port of packet buffer 125. Multiplexer 380 may also have a fourth input for providing a direct address. The output signals of multiplexer 380 is used to address buffer 125. The output data is provided at the respective packet buffer output.

Figure 4:
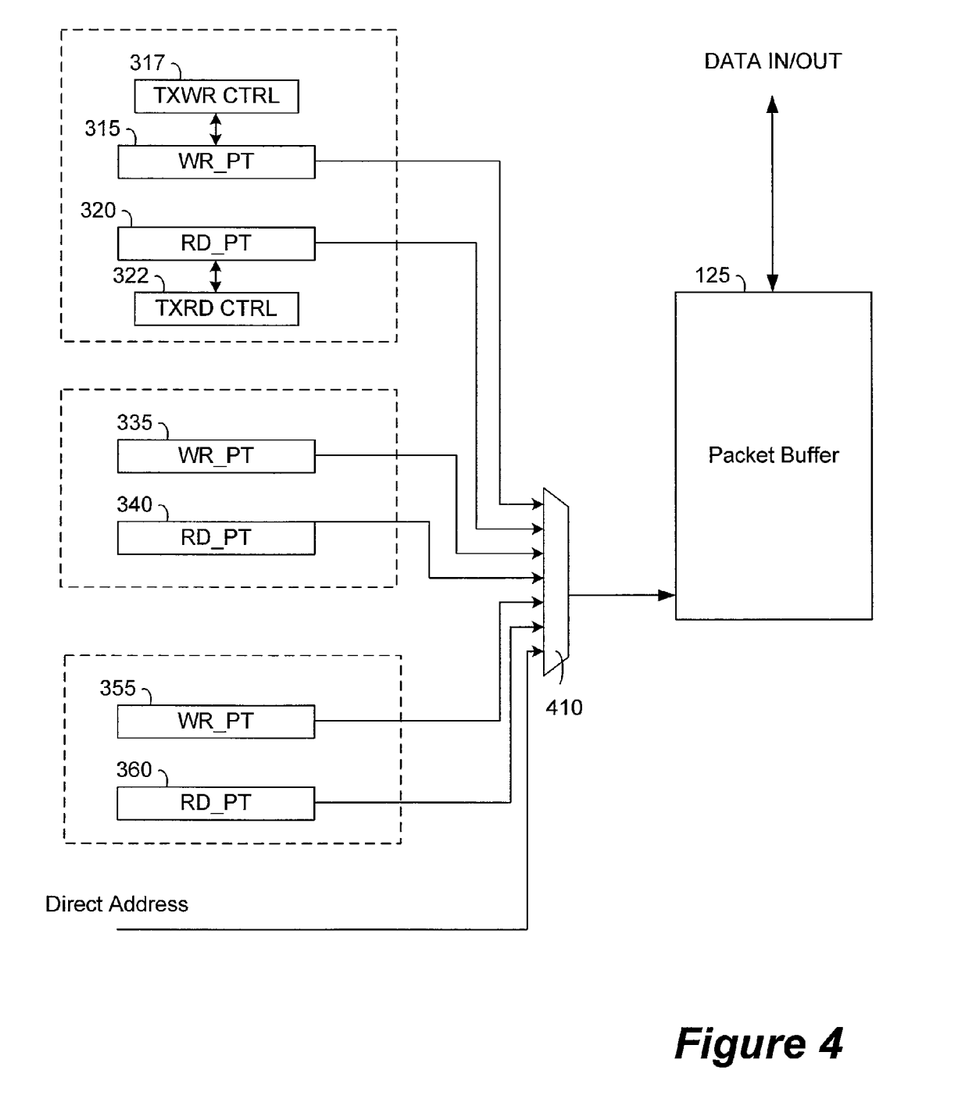
FIG. 4 illustrates yet another embodiment of a buffer access logic.

FIG. 4 shows a second embodiment with a single multiplexer 410. Multiplexer 410 has 7 inputs and selects one of these inputs for addressing packet buffer 125. Each of the three register sets provides for a write and a read address. Moreover, a direct address can be provided circumventing the indirect addressing provided by the three register sets. In this embodiment, the data input/output is directly routed to a respective data bus without any intervening latches. However, according to other embodiments, data latches can be provided individually or for all indirect register sets.

A read command send by an external processor to the controller causes the system control to execute a sequence of steps to provide the external processor with the requested data. To this end, the system control uses a designated register set to access the buffer. Each register set may have dedicated read and write commands or dedicated memory-mapped addresses. However, in another embodiment, a special function register may be used to define which register set is to be used. Other commands may cause a block read or packet read which provide for a plurality of data. System control unit 110 provides for the respective functionality by a state machine or small controller unit that interprets and executes the defined commands.

Conventional windowed buffer access systems provide merely for a single register set consisting of a read/write pointer register or one separate read pointer register and one write pointer register. Each read or write pointer is usually auto-incremented or auto-decremented. Thus, at least anytime when a task switch occurs that requires access to a different part of the buffer, the accessing controller must first save the content of at least the pointer registers. Moreover, each read and write register may only access predefined areas of the buffer. For example, the buffer may be segmented into an area for the receiving channel RX and an area for the transmitting channel TX. These areas may not overlap and thus depending on which channel is active a single address pointer register set must be compared to the respective boundaries of that channel.

According to an embodiment, the access circuitry for windowed access to the buffer comprises a plurality of independent register sets wherein each set comprises a separate data register and associated read and write pointer registers. In one embodiment, separate register sets for the read and write channel can be provided. Each register set may comprise an independent control logic for controlling the boundaries. For example as shown for the transmit channel, a transmit write pointer boundary control unit 317 may be coupled with register 315. This boundary control unit 317 may include auto increment and/or auto-decrement logic as well as compare logic to compare the content of register 315 against a predefined or programmable boundary. In one embodiment, this control unit 317 can generate an interrupt if a boundary is crossed or can reset the address to a predefined or programmable segment start address, thereby, providing for a wrap around functionality. In the latter case, the pointer register 315 could provide the functionality of a first in first out (FIFO) register.

A separate control unit 322 may be provided for the read pointer register 320. However, each set of registers may only provide for a single boundary control unit that operates on both read and write pointer registers 315 and 320. Even though not shown, similar units can be provided for the read control register set 330-340 and the user defined access register set 350-360. Multiplexer 380 is controlled by the interface or system control unit 110 and selects the appropriate outputs to couple the buffer 125 with a single set of control registers.

Figure 5:
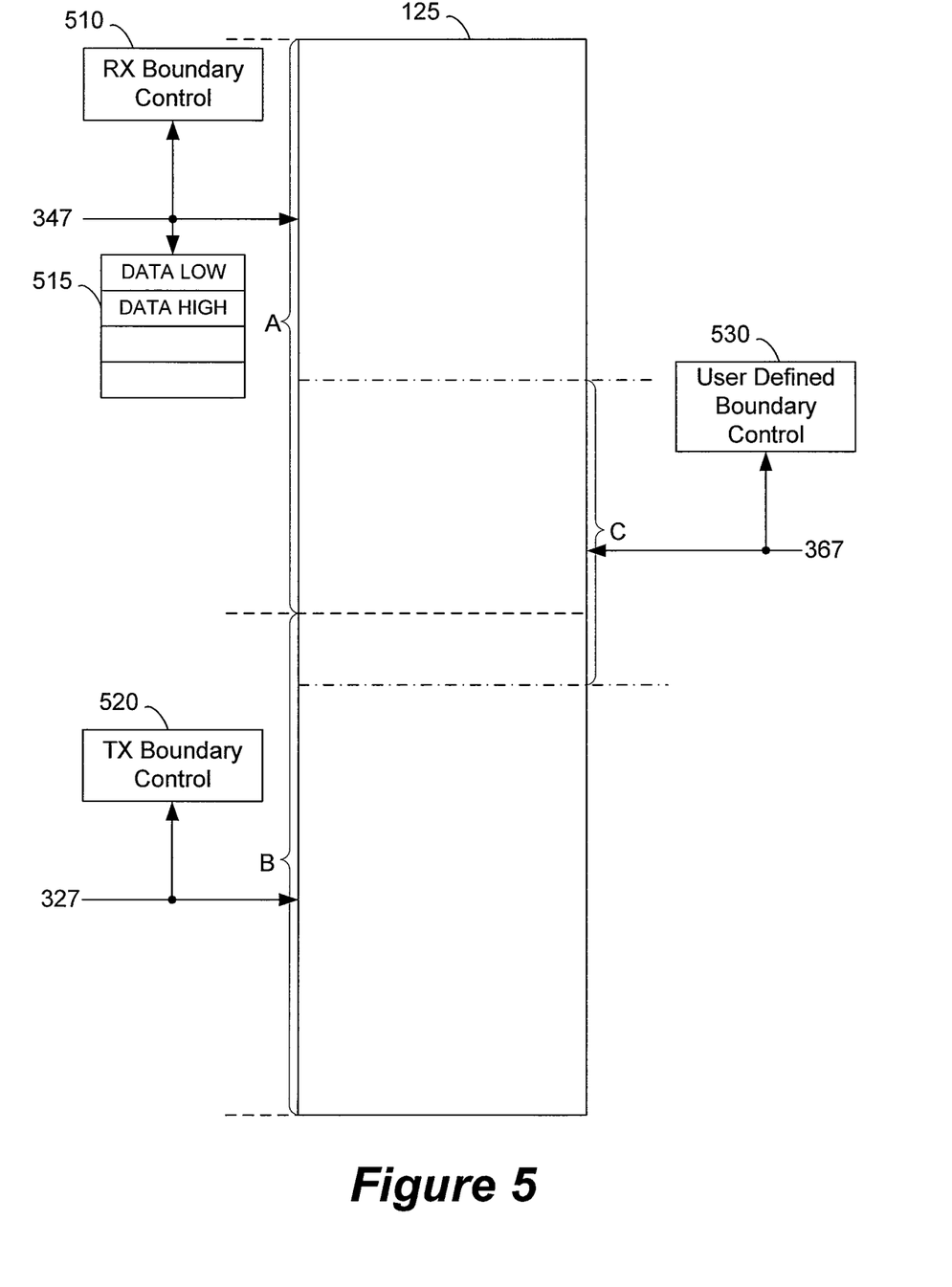
FIG. 5 illustrates a variable block assignment within a buffer according to an embodiment.

FIG. 5 shows an example of predefined or programmable segments. For example, buffer 125 may be divided into two main non-overlapping segments A and B. However, in other embodiments, the segments can also be defined to overlap. A first address 347 points to any address for the receive channel within the predefined boundaries A. In this embodiment, a single control unit 510 is used to control the registers 335 and 340. This control register can auto-increment or decrement the content of the register after an access to buffer 125 has been completed. Furthermore, unit 510 may provide for a boundary check of the respective address and reset the register to a start address of segment A if an increment of the address would cause a cross over into segment B. Similarly, control unit 520 may provide for the same functionality with respect to the transmit channel and registers 315 and 320. Special function registers may be provided to define segments A and B, for example, a register may comprise the split address that divides buffer 125 into two segments. However, in other embodiments, the boundaries of these segments can be freely programmed. Furthermore, additional special function registers may be provided to define a user defined address segment C as shown in FIG. 4. This user defined segment may overlap with one or both segments. User defined control unit 530 may also provide for similar functionalities as units 510 and 520. Due to the fact that the transmit channel and the read channel as well as a further user defined access comprise separate access registers, the respective control logic can be simplified because only a single boundary address must be compared. Moreover, switches between those channels do not require the necessity of saving the content of these registers, thus, these registers have to be saved only in certain scenarios. This allows for reduced software overhead and avoids any timing problems with respect to these pointer registers.

As further shown in FIG. 4, according to another embodiment, additional special function registers may be provided by register block 515. One register DATALOW may indicate the level of unread data in a segment by comparing the address 347 and the respective pointer in unit 135 (See FIG. 1). A predefined threshold may generate an interrupt to signal a low level of data in buffer 125. Similarly, a high level of data can be indicated by register DATAHIGH. Again this register could cause an interrupt if a high threshold level is exceeded indicating to a microcontroller or processor that the buffer has to be read to prevent an overflow. Other registers may be provided as indicated by the empty control registers that, for example, comprise certain absolute boundary addresses within a segment that may generate interrupts. However, other special functions associated with the address pointer signals 327, 347, and 367 may be provided.

In other embodiments, buffer 125 may be divided into more than 2 segments. Specific packet filters can be assigned in units 135 and 145 (See FIG. 1) to provide for respective transmit and receive functionality that is assigned to those segments. For example, each filter may read or write only from an assigned segment. Units 135 and 145 may provide for the same wrap around functionality, thus, creating respective FIFO registers. Further control logic can be provided to prevent overwriting of unread data by comparing the respective address pointers of units 135, 145 and window access registers 250.

The present invention is not limited to Ethernet controllers but can be applied to any type of stand alone controller or integratable controller having a memory that is indirectly accessed via respective pointer registers.

What is claimed is:

1. A controller comprising:
an interface having limited addressing capabilities;
a buffer memory coupled with said interface, wherein the buffer memory has an address range that cannot be directly addressed by said interface;
a first set of registers comprising a first address register coupled with address lines of said buffer memory and configured to address the buffer memory;
a second set of registers independent from the first set of registers comprising a second address register coupled with address lines of said buffer memory and configured to address the buffer memory; and
a control unit for decoding and executing buffer memory access commands received by the interface, the control unit being configured to access the buffer memory through either said first or second address register of said first or second set of registers, wherein an address stored in said first or second address register is applied to address lines of said buffer memory and wherein associated data is read or written from or to said buffer memory.

2. The controller according to claim 1, wherein the auto-address register of the first set of registers comprises a first read pointer register and a first write pointer register and the second address register of the second set of registers comprises a second read pointer register and a second write pointer register.

3. The controller according to claim 1, further comprising an auto-increment or auto-decrement unit for incrementing or decrementing the content of at least one register of the first and/or second set of registers.

4. The controller according to claim 1, further comprising a wrap around unit for resetting the address stored in at least one pointer register of the first and/or second set of registers to a predefined address.

5. The controller according to claim 2, further comprising at least one multiplexer coupled with each pointer register wherein the multiplexer further receives a direct address signal.

6. The controller according to claim 1, wherein the first and second set of registers further comprise first and second data registers coupled with data lines of said buffer memory for storing said associated data.

7. The controller according to claim 1, further comprising a special function register for defining a split address in the buffer memory splitting the buffer memory into a first segment assigned to the first set of registers and a second segment assigned to the second set of registers.

8. The controller according to claim 1, further comprising a plurality of special function registers for defining memory segments in the buffer memory assigned to each set of registers.

9. The controller according to claim 1, further comprising at least a third set of registers independent from the first and second set of registers for accessing the buffer memory, wherein the third set of registers comprises a third read pointer register and a third write pointer register.

10. An Ethernet controller comprising:
a physical layer and a media access control layer;
a buffer memory, being coupled with the physical and media access control layer;
a set of transmit (TX) registers coupled with address lines of the buffer memory, comprising a first read pointer register and a first write pointer register;
a set of receive (RX) registers coupled with address lines of the buffer memory, comprising a second read pointer register and a second write pointer register;
a set of user defined registers coupled with address lines the buffer memory, comprising a third read pointer register and a third write pointer register; and
a control unit for decoding and executing buffer memory access commands received by an interface having limited addressing capabilities, wherein the buffer memory has an address range that cannot be directly addressed by said interface, the control unit being configured to access the buffer memory through either said transmit, receive, or user defined registers wherein an address stored in one of said read or write pointer registers is applied to address lines of said buffer memory and wherein associated data is read or written from or to said buffer memory.

11. The Ethernet controller according to claim 10, further comprising an auto-increment or auto-decrement unit for incrementing or decrementing the content of any one of the pointer registers.

12. The Ethernet controller according to claim 10, further comprising a wrap around unit for resetting the address stored in any one of the pointer registers to a predefined start address.

13. The Ethernet controller according to claim 10, further comprising at least one multiplexer coupled with each pointer register.

14. The Ethernet controller according to claim 13, wherein the multiplexer further receives a direct address signal.

15. The Ethernet controller according to claim 10, further comprising a special function register for defining a split address in the buffer memory splitting the buffer memory into a first segment assigned to the transmit registers and a second segment assigned to the receive registers.

16. The Ethernet controller according to claim 15, further comprising a plurality of special function registers for defining a memory segment for the user defined registers.

17. The Ethernet controller according to claim 10, further comprising a plurality of special function registers for defining memory segments in the buffer memory assigned to each set of registers.

18. A method for accessing a memory in a controller, comprising the steps of:
loading a first address of the memory through an interface having limited addressing capabilities into a first address register of a first set of access registers, wherein the memory is arranged within the controller and has an address range that cannot be directly addressed by said interface;
loading a second address of the memory through the interface into a second address register of a second set of access registers;
receiving a first read command through the interface;
applying an address stored in the first address register to said memory and receiving first data from the first address in the memory;
outputting the first data through the interface;
receiving a second read command through the interface;
applying an address stored in the second address register to said memory and receiving second data from the second address in the memory; and
outputting the second data through the interface.

19. The method according to claim 18, further comprising the step of auto-incrementing or auto-decrementing the first and second address registers after reading the memory.

20. The method according to claim 19, further comprising the step of performing an address wrap around function on the first and second address registers after auto-incrementing or auto-decrementing.

21. The method according to claim 18, comprising the steps of:
loading a third address of the memory through the interface into a third address register of a third set of access registers;
receiving a third read command through the interface;
applying an address stored in the third address register to said memory and receiving third data from the third address in the memory; and
outputting the third data through the interface.

22. A method for accessing a memory in a controller, comprising the steps of:
loading a first address through an interface with limited addressing capabilities into a first address register of a first set of access registers, wherein the buffer memory is arranged within said controller and has an address range that cannot be directly addressed by said interface;
loading a second address through the interface into a second address register of a second set of access registers;
receiving a first write command through the interface;
receiving first write data through the interface;
applying an address stored in the first address register to said memory and storing the first data under the first address into the memory;
receiving a second write command through the interface;
receiving second write data through the interface; and
applying an address stored in the second address register to said memory and storing the second data under the second address into the memory.

23. The method according to claim 22, further comprising the step of auto-incrementing or auto-decrementing the first and second address registers after reading the memory.

24. The method according to claim 23, further comprising the step of performing an address wrap around function on the first and second address registers after auto-incrementing or auto-decrementing.

25. The method according to claim 22, comprising the steps of:
loading a third address through the interface into a third address register of a third set of access registers;
receiving a third write command through the interface;
receiving third write data through the interface; and
applying an address stored in the third address register to said memory and storing the third data under the third address into the memory.

* * * * *